United States Patent
Kang et al.

(10) Patent No.: US 8,891,049 B2
(45) Date of Patent: Nov. 18, 2014

(54) IN-PLANE SWITCHING MODE LIQUID CRYSTAL DISPLAY DEVICE

(75) Inventors: Dong Ho Kang, Gumi-si (KR); Su Woong Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 209 days.

(21) Appl. No.: 10/463,511

(22) Filed: Jun. 18, 2003

(65) Prior Publication Data
US 2004/0119927 A1     Jun. 24, 2004

(30) Foreign Application Priority Data
Dec. 18, 2002    (KR) .................. 10-2002-0081086

(51) Int. Cl.
| G02F 1/1343 | (2006.01) |
| G02F 1/1335 | (2006.01) |
| G02F 1/1333 | (2006.01) |
| G02F 1/1362 | (2006.01) |

(52) U.S. Cl.
CPC .... *G02F 1/134363* (2013.01); *G02F 1/133512* (2013.01); *G02F 2203/01* (2013.01); *G02F 2001/133354* (2013.01); *G02F 1/13624* (2013.01); *G02F 2001/13625* (2013.01)
USPC ...................................................... 349/141

(58) Field of Classification Search
USPC ........................................................ 349/141
See application file for complete search history.

(56) References Cited

U.S. PATENT DOCUMENTS

| 5,907,379 A | 5/1999 | Kim et al. |
| 6,091,473 A * | 7/2000 | Hebiguchi .................. 349/141 |
| 6,100,956 A | 8/2000 | Oh-e et al. |
| 7,196,761 B2 * | 3/2007 | Lee ............................. 349/144 |
| 2004/0021801 A1 * | 2/2004 | Tak et al. ......................... 349/1 |
| 2004/0075780 A1 * | 4/2004 | Lee ................................ 349/43 |

FOREIGN PATENT DOCUMENTS

JP     9-080473     3/1997

* cited by examiner

*Primary Examiner* — Timothy L Rude
(74) *Attorney, Agent, or Firm* — McKenna Long & Aldridge LLP (57) ABSTRACT

There is provided an in-plane switching mode liquid crystal display device which includes a lower substrate defined and surrounded by a plurality of gate lines, common lines, and data lines, and including a thin film transistor, a plurality of common electrodes extending from the common line, and a plurality of pixel electrodes extending from a lead interconnection line connected with a drain electrode of the thin film transistor, and having sub-pixels aligned in a matrix shape and divided into an aperture region and a non-aperture region; an upper substrate having sub-color filters and a black matrix completely overlapping with the non-aperture region inside the sub-pixel, formed thereon; and a liquid crystal layer interposed between the lower substrate and the upper substrate.

8 Claims, 9 Drawing Sheets

IN-PLANE SWITCHING MODE LIQUID CRYSTAL DISPLAY DEVICE

This application claims the benefit of the Korean Application No. P 2002-81086 filed on Dec. 18, 2002, which is hereby incorporated by reference for all purposes as if fully set forth herein.

BACKGROUND OF THE INVENTION

1. Field of the Invention

The present invention relates to a liquid crystal display device, and more particularly, to an in-plane switching mode liquid crystal display device formed such that the black matrix on an upper substrate is included in the non-aperture region on a lower substrate.

2. Discussion of the Related Art

Generally, a liquid crystal display (LCD) device operates by the optical anisotropy and polarization of a liquid crystal material therein. Since the liquid crystal material includes liquid crystal molecules, each having a thin and long structure, the liquid crystal material has a specific orientation according to the alignment direction of the liquid crystal molecules. Hence, the alignment direction of the liquid crystal molecules can be controlled by applying an external electric field to the liquid crystal.

As the alignment of the liquid crystal molecules are changed by applying an electric field, light polarization caused by the optical anisotropy of the liquid crystal material is modulated to display image information.

Liquid crystal material can be classified into positive (+) liquid crystal having a positive dielectric anisotropy and negative (−) liquid crystal having a negative dielectric anisotropy depending on its electrical properties. Liquid crystal molecules having a positive dielectric anisotropy are arranged such that their long axes are parallel with the direction of an applied electric field, and liquid crystal molecules having a negative dielectric anisotropy are arranged such that their long axes are normal to the direction of an applied electric field.

Nowadays, an active matrix LCD in which thin film transistors and pixel electrodes connected to the thin film transistors are arranged in a matrix configuration are widely being used because of their high resolution and superior moving picture reproducing capability.

Figure 1:
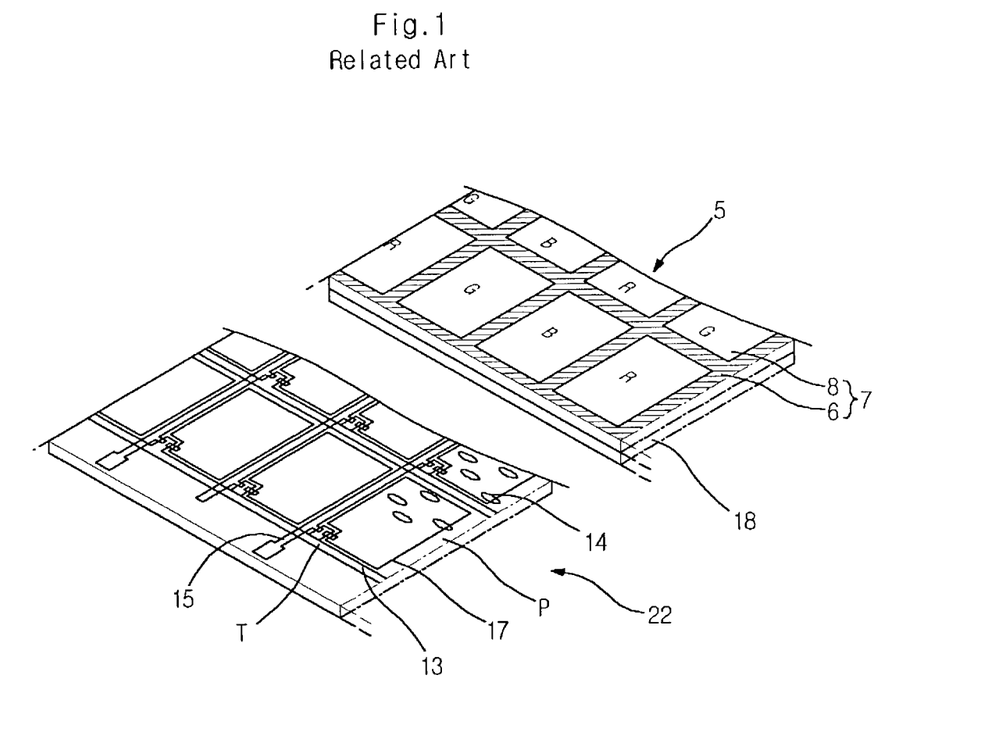
FIG. 1 is a partial exploded perspective view of a general liquid crystal panel.

FIG. 1 is a partial exploded perspective view of a general liquid crystal panel.

Referring to FIG. 1, a structure of the liquid crystal panel that is a main element of the LCD device will be reviewed hereinafter.

The LCD device includes an upper substrate 5 and a lower substrate 22. The upper substrate 5 includes a color filter layer 7 having sub-color filters 8 of red (R), green (G), and blue (B) and a black matrix 6 between the sub-color filters 8, and a transparent common electrode 18 formed on the color filter 7. The lower substrate 22 includes pixel regions (P), pixel electrodes 17 formed on the pixel regions (P), and an array of interconnection lines including switching elements (T). A liquid crystal layer 14 as described above is interposed between the upper substrate 5 and the lower substrate 22.

The lower substrate 22 is called an "array substrate". On the lower substrate 22, a plurality of thin film transistors that function as switching elements are arranged in a matrix shape, near the crossing of gate lines 13 and data lines 15.

The pixel regions (P) are defined by the gate lines 13 and the data lines 15 crossed with the gate lines 13. The pixel electrode 17 formed on the pixel region (P) is made of a transparent conductive material, such as indium-tin-oxide (ITO), having superior light transmittance.

Explaining the operation of the liquid crystal panel, the LCD device constructed as above displays images when liquid crystal molecules of the liquid crystal layer 14 between two substrates are aligned by a voltage applied between the common electrode 18 of the upper substrate 5 and the pixel electrode 17 on the lower substrate 22 to control the amount of light passing through the liquid crystal layer 14.

Described as above, the LCD device structured by the common electrodes 18 over the pixel electrodes 17 operates to align the liquid crystal material by the electric field applied between the top and bottom of the device. The properties of permeability and aperture ratio or the like become superior, and the common electrodes of the upper substrate function as ground connections to prevent the destruction of the liquid crystal cells.

However, the operation of the liquid crystal material driven by the electric field applied to the top and bottom of the device has a disadvantage that its visual angle property (viewing angle) is inferior, and therefore, there has been introduced a new technology to solve the above disadvantage. Hereinafter, an effort to solve the disadvantage of the inferior visual angle property (viewing angle) by using an in-plane switching mode (IPS) LCD device will be reviewed.

Figure 2:
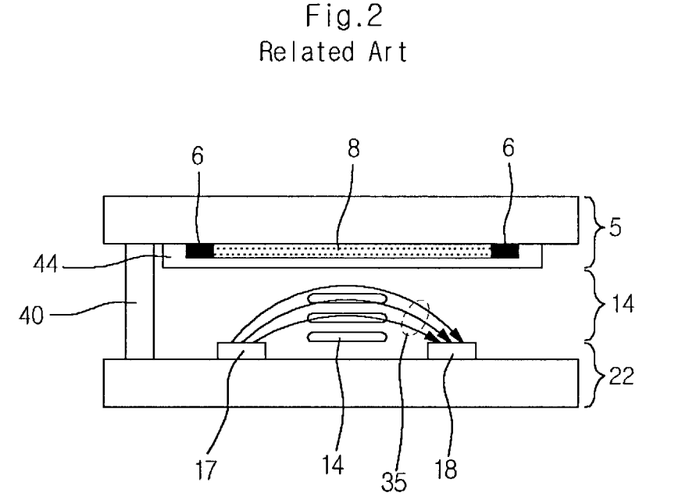
FIG. 2 is a sectional view illustrating a part of a related art in-plane switching mode LCD device.

FIG. 2 is a sectional view illustrating a part of a related art in-plane switching mode LCD device.

Referring to FIG. 2, the related art in-plane switching mode LCD device includes a pixel electrode 17 and a common electrode 18 on a lower substrate 22. A liquid crystal layer 14 ioperates according to the in-plane electric field formed between the pixel electrode 17 and the common electrode 18 on the lower substrate 22.

Further, an upper substrate 5 is formed in the upper region over the liquid crystal layer 14. The in-plane switching mode LCD device structured as above has a characteristics in that an in- plane electric field 35 is used since the pixel electrode 17 and the common electrode 18 are all formed on the same plane substrate.

Further, an overcoat layer 44 is formed on the upper substrate 5, for protecting each sub-color filters 8. A sealant 40 is formed along the edge of the upper substrate 5 and the lower substrate 22 for adhering the upper substrate 5 and the lower substrate 22.

Further, a black matrix 6 is formed on the upper substrate 5, and since the in-plane switching mode LCD device operates the liquid crystal by a plane electric field, the black matrix 6 is comprised of an organic material (resin) not metal, for preventing the distortion of the electric field.

The black matrix 6 exists in the area between the sub color filters 8 and functions as a light shutter. An aperture region of the liquid crystal panel is defined by the black matrix 6.

The substrates structured as above can be formed by a deposition process, a photolithography process (hereinafter referred to as a 'photo-process'), and an etching process, etc.

The photo-process utilizes a principle that, when photoresist (hereinafter referred to as a 'PR') is exposed to light, a chemical reaction occurs to change the property of the PR. In the photo-process, light is selectively irradiated onto the PR through a mask of a desired pattern, thereby forming the same pattern as the pattern of the mask. The photo-process includes a PR coating step in which a PR corresponding to a general picture film is coated on, an exposure step in which light is selectively irradiated onto the PR using a mask, and a developing step in which the exposed portion of the PR is removed to form a pattern.

Nowadays, the size of the substrate becomes greater than ever with the mass production of large-sized LCD devices.

Therefore, one exposure mask is not enough when forming the black matrix 6 on the upper substrate 5 for large-size LCD devices. That is, as the screen size of the upper substrate 6 is greater than the exposure mask used in the photo-process, during the exposure step, the screen of the upper substrate is divided into a plurality of shots and is repeatedly exposed, which is a step exposure method.

However, while forming the black matrix 6 by the step exposure as above, limitations in the preciseness of the exposure equipment causes reduced picture quality of the LCD, such as the generation of stitch spots, by the stitch failure that the misalignment between the shots occurs, that is, the change of critical division (CD) on the interfacial boundaries between the shots.

As an aperture region for each pixel in the liquid crystal panel is defined by the black matrix 6, the misalignment of the black matrix 6 brings the size difference of each aperture region each sub-pixel 10, and the difference of the brightness in each sub-pixel 10, which causes the stitch failure as above.

Therefore, in the above structure of the related art LCD devices, the amount of light penetrating each sub-pixel 10 is different depending on the shapes of the black matrix 6, which determines the aperture region of each sub-pixel 10, by the stitch failure, thereby causing spots on display images and reduced picture quality of an LCD device.

Therefore, in the above structure of the conventional LCD devices, the amount of light penetrating each sub-pixel 10 is different depending on the shapes of the black matrix 6, which determines the aperture region of each sub-pixel 10, by the stitch failure, thereby causing spots on display images and reduced picture quality of an LCD device.

Figure 3:
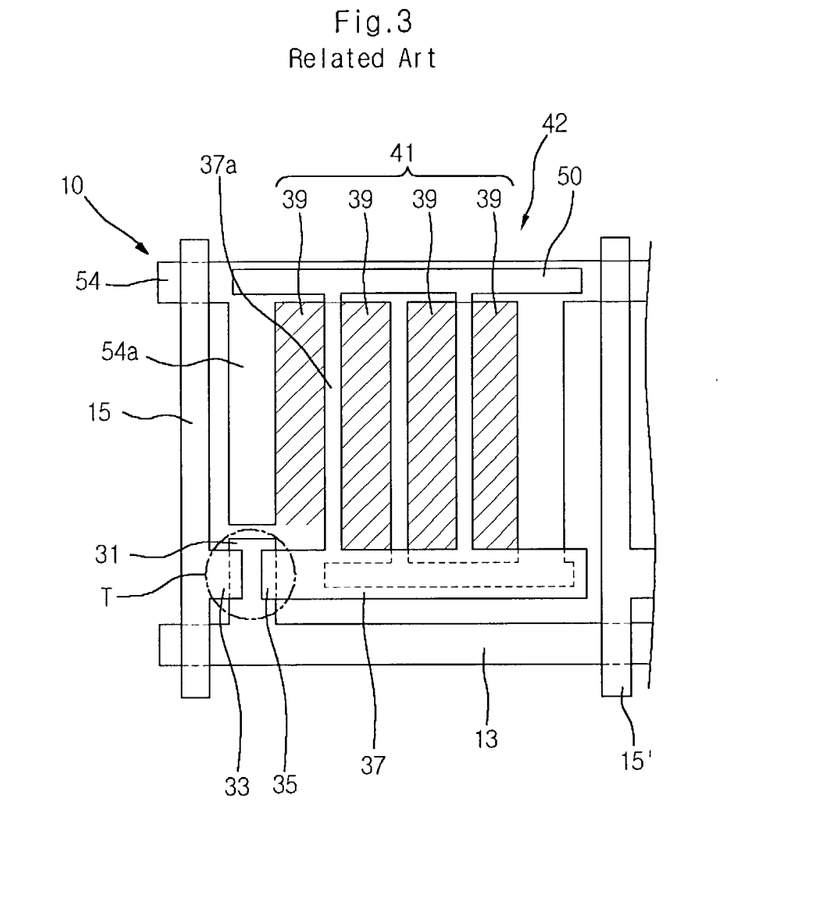
FIG. 3 is a plane view partially illustrating a lower substrate of a related art in-plane switching mode LCD device.
Figure 4:
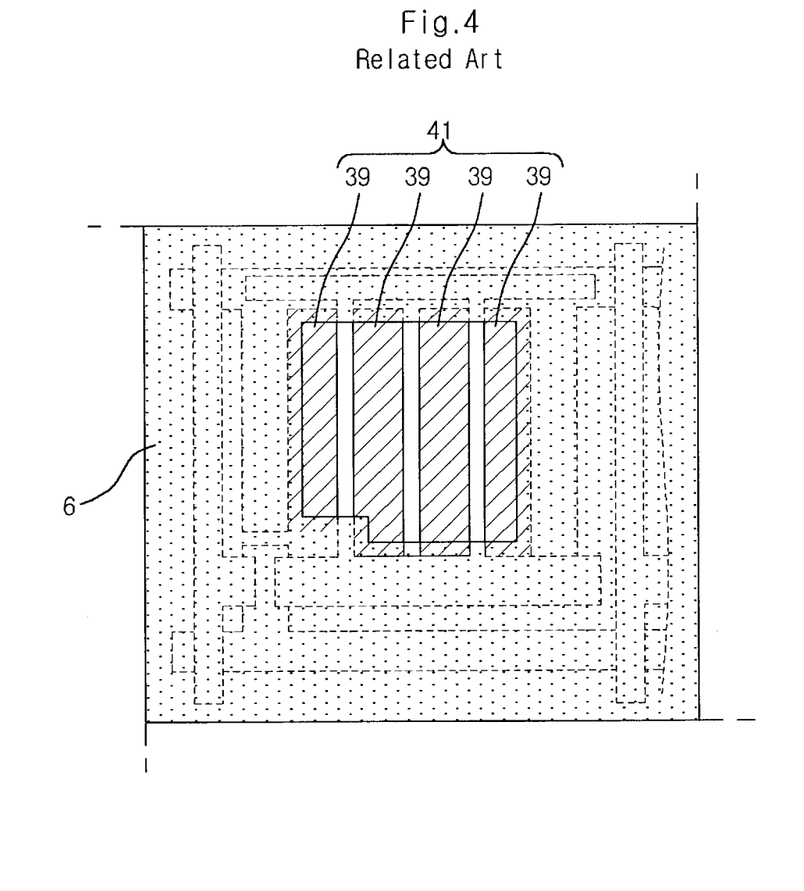
FIG. 4 is a plane view illustrating the region including a black matrix of an upper substrate facing a sub-pixel in FIG. 3.
Figure 5:
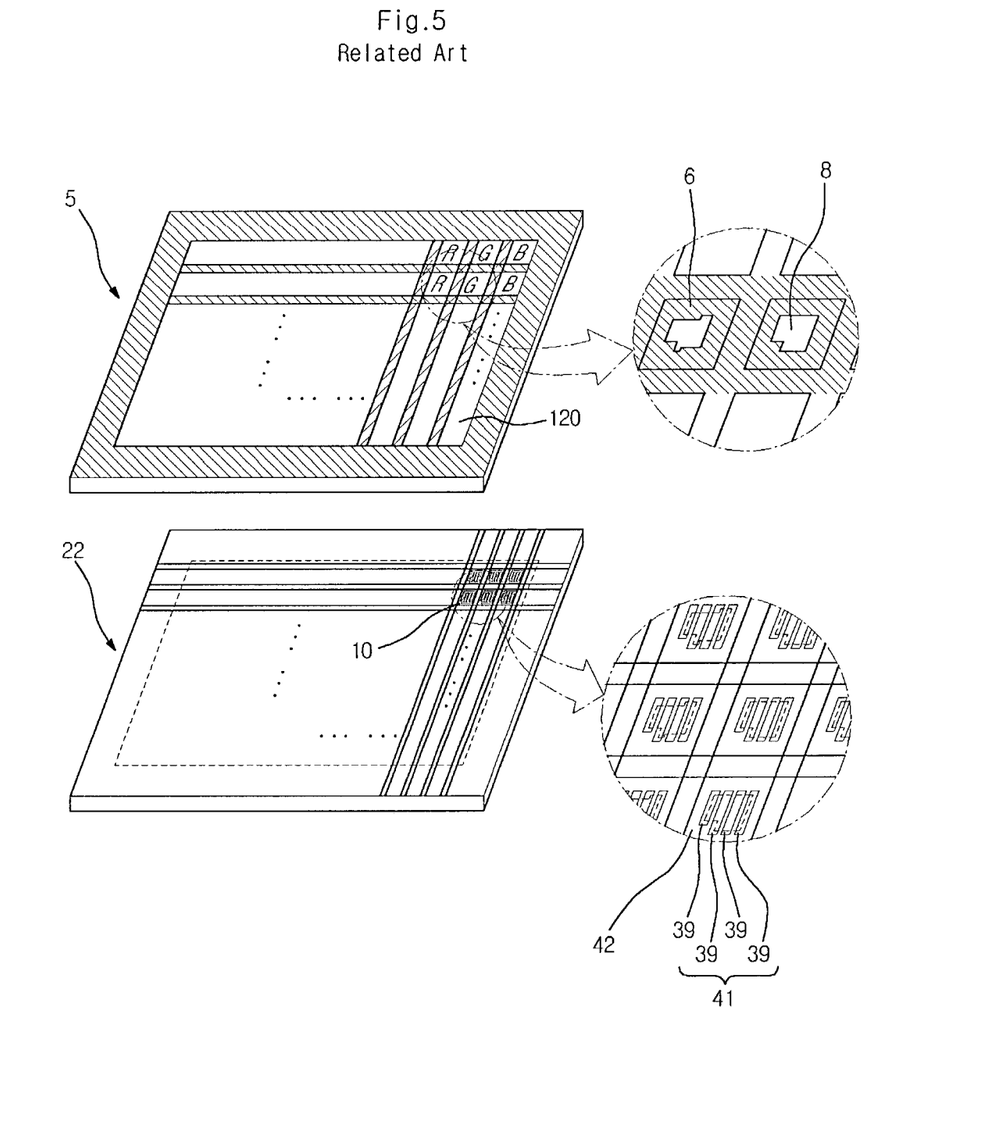
FIG. 5 is an exploded perspective view illustrating a part of the related art in-plane switching mode LCD device.

FIG. 3 is a plane view partially illustrating a lower substrate of the related art in-plane switching mode LCD device, and FIG. 4 is a plane view illustrating the region including a black matrix of an upper substrate facing a sub-pixel in FIG. 3, and FIG. 5 is an exploded perspective view illustrating a part of the related art in-plane switching mode LCD device.

Referring to FIG. 3, the lower substrate is configured to have a plurality of gate lines 13 and the common lines 54 formed thereon in parallel in the horizontal direction, and in the vertical direction, a plurality of data lines 15 formed thereon crossed with the gate lines 13 and the common lines 54.

As described above, a sub-pixel 10 is defined as a region surrounded by the gate line 13, the common line 54, and the data lines 15, 15' on the lower substrate.

Further, a gate electrode 31 is formed in one side of the gate line 13, and a source electrode 33 is formed in one side of the data line 15 adjacent to the gate electrode 31 and partially overlaps with the gate electrode 31. A drain electrode 35 is formed to face the source electrode 33 distanced therefrom by a gap, and therefore, all above elements form a thin film transistor region (T).

Further, the common line 54 has a plurality of common electrodes 54*a* extending from the common line 54. The drain electrode 35 is connected to a lead interconnection line 37 from which a plurality of pixel electrodes 37*a* extend.

The common electrodes 54*a* and the pixel electrodes 37*a* are formed in an alternating manner and are substantially parallel to each other. An image display region of the sub-pixel 10 is formed by the plurality of the common electrodes 54*a* and the pixel electrodes 37*a*.

Further, a storage capacitor 50 is formed in the region where the common line 54 and the plurality of pixel electrodes 37*a* partially overlap with the common line 54.

The common electrodes 54*a* formed in the sub-pixel 10 described are held at a common voltage that is received from the common lines 54. Image signals of varying voltage levels are applied to the pixel electrodes 37*a* from the data line 15 in accordance with a gate voltage supplied via the gate electrode 31.

Therefore, a plane electric field is formed by the voltage applied on the pixel electrodes 37*a* and the common electrodes 54*a*, and the alignment degree of the liquid crystal molecules can be varied depending on the intensity of such an electric field to display images.

A block 39 refers to a region displaying images according to the plane electric field between the pixel electrodes 37*a* and the common electrodes 54*a*. Each sub-pixel 10 includes a plurality of the blocks 39. Normally, as illustrated in FIG. 3, a four-block type, in which four blocks 39 exist in one sub-pixel 10, is widely used.

The sub-pixels 10 are distributed on the lower substrate in a matrix shape, and when a light (e.g., from a backlight unit (not shown)) passes through a plurality of blocks 39 in each sub-pixel 10, images can be displayed. The area of the plurality of blocks passing the light is an aperture region 41, and on the other hand, the region of the sub-pixel 10 other than where the plurality of blocks 39 are a non-aperture region 42, which does not display images.

However, in the related art, the aperture region formed by the plurality of blocks determines its size by the black matrix formed on the color filter. This will be explained in more detail with reference to FIG. 4.

Referring to FIG. 4, the light passing through the plurality of blocks 39 in the sub-pixel 10 from the backlight penetrates a plurality of sub-color filters (R, G, B) 8 formed on the upper substrate 5 to display various types of images, including a still image or moving images. In the region where images are not displayed, a black matrix 6 is formed to prevent a light leakage phenomenon.

The black matrix 6, in the related art, is formed by including a part of the aperture region, that is, the region of the blocks 39 as well as the thin film transistor region (T) and the data/gate line 13/15. The black matrix partially overlaps with the region of the blocks 39 taking into account the bonding margins of the lower substrate and the upper substrate, or the like.

Accordingly, in the related art LCD device, the aperture ratio is determined by the black matrix 6, and not all the light passing through the aperture region formed on the lower substrate contributes to the display.

Further, referring to FIG. 5, the related art in-plane switching mode LCD panel includes a upper substrate 5 having a black matrix (BM) 6 and sub-color filters (R, G, B) 8, and a lower substrate 22 having the sub-pixels 10 in FIG. 3 aligned in a matrix shape. A liquid crystal material (not shown) fills the gap between the upper substrate 5 and the lower substrate 22.

The images displayed through the plurality of blocks 39 formed in each sub-pixel 10 on the lower substrate 22 are bounded by the black matrix 6 formed on the upper substrate 5.

That is, the black matrix 6 reaches even the peripheral region of the aperture region 41 as well as the region including the non-aperture region 42 of the lower substrate 22, and accordingly, the displayed region in the related art in-plane switching mode LCD device is defined by the black matrix 6.

However, as described above, with the enlargement of the lower substrate 22 and the upper substrate 5 in recent years, the black matrix 6 cannot be formed using just one exposure mask. That is, as the display size of the upper substrate 5 is greater than that of the exposure mask used in the photo-process. During the exposure step, the screen of the upper substrate is divided into a plurality of shots and is repeatedly exposed, which is a step exposure method.

However, while forming the black matrix 6 by the step exposure as above, limitations in the preciseness of the exposure equipment causes a stitch failure due to the misalignment between the shots. Thus, the light penetration region, that is, the image displayed region, is not the same in every sub-pixel 10, illustrated in FIG. 4, as the black matrices 6 in the sub-pixel 10 are misaligned so as not to coincide with each other exactly. Therefore, brightness varies in each sub-pixel 10, and the stitch spot failure occurs on the image of the LCD device.

SUMMARY OF THE INVENTION

Accordingly, the present invention is directed to an in-plane switching mode liquid crystal display device that substantially obviates one or more problems due to limitations and disadvantages of the related art.

An advantage of the present invention is to provide an in-plane switching mode liquid crystal display device for compensating stitch spots due to the misalignment between shots during the formation of a black matrix by forming the black matrix on an upper substrate to be included into a non-aperture region on a lower substrate.

The present invention is to solve the problem caused by the stitch failure in which the overlapping exposure shots are misaligned The stitch problem can be minimized by forming the black matrix corresponding only to the non-aperture region on the lower substrate.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an in-plane switching mode liquid crystal display device which may include a lower substrate and an upper substrate; a plurality of sub-pixels on the lower substrate, defined and surrounded by a plurality of gate lines and data lines, each of the sub-pixels having an aperture region and a non-aperture region and including a common line; a black matrix on the upper substrate and having an edge within the non-aperture region; and a liquid crystal layer between the lower substrate and the upper substrate.

Further, according to another aspect of the present invention, there is provided an in-plane switching mode liquid crystal display device, which may include a lower substrate having a plurality of sub-pixels aligned thereon in a matrix shape, each sub-pixel being defined and surrounded by a plurality of gate lines and data lines, each of the sub-pixels having an aperture region and a non-aperture region and including a common line; an upper substrate having sub-color filters and a black matrix formed thereon, an edge of the black matrix completely overlapping with the non-aperture region inside the sub-pixel; and a liquid crystal layer between the lower substrate and the upper substrate.

Further, according to another aspect of the present invention, there is provided a method of manufacturing an in-plane switching liquid crystal display device, including providing a lower substrate and an upper substrate; forming a plurality of data lines on the lower substrate; forming a plurality of gate lines on the lower substrate, the gate lines substantially perpendicular to the data lines on the lower substrate wherein a plurality of sub-pixels are defined on the lower substrate by a plurality of gate lines and data lines, each of the sub-pixels having an aperture region and a non-aperture region; forming a plurality of common lines on the lower substrate, wherein each sub-pixel includes at least one common line; forming a black matrix on the upper substrate and having an edge within a corresponding non-aperture region on the lower substrate; and providing a liquid crystal layer between the lower substrate and the upper substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 6:
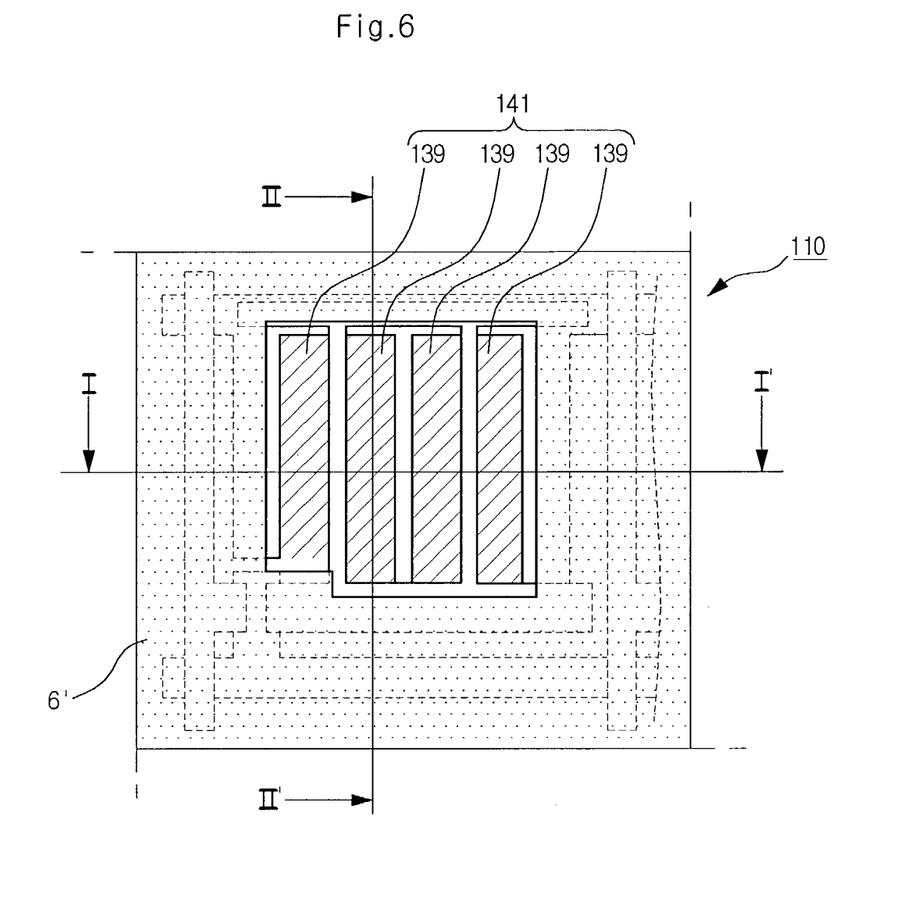
FIG. 6 is a plane view illustrating the region including a black matrix of an upper substrate facing a sub-pixel in an in-plane switching mode LCD device according to a present invention.

FIG. 6 is an upper plan view of a sub-pixel 110 of an in-plane switching mode liquid crystal display device according to the present invention and illustrates a region of the upper substrate including a black matrix 6' over an aperture region 141, the aperture region 141 including aperture blocks 139, and a non-aperture region of a lower substrate.

Referring to FIG. 6, according to the present invention, the region including the black matrix 6' does not overlap with the blocks 139, and therefore, unlike the related art, the black matrix 6' does not define the aperture region.

That is, the light from a backlight unit (not shown) passing through the plurality of blocks 139 in the sub-pixel 110 penetrates a plurality of sub-color filters (R, G, B) 8 formed on the upper substrate 5 to display various types of images, including a still image or moving images. The black matrix 6' is formed in the remaining region outside the display region to prevent a light leakage phenomenon.

The black matrix 6' covers only a thin film transistor region (T) and a data/gate line 13/15 on a lower substrate. The black matrix 6' may be configured so that it does not overlap any part of the region of blocks 139 of the aperture region 141.

Figure 7:
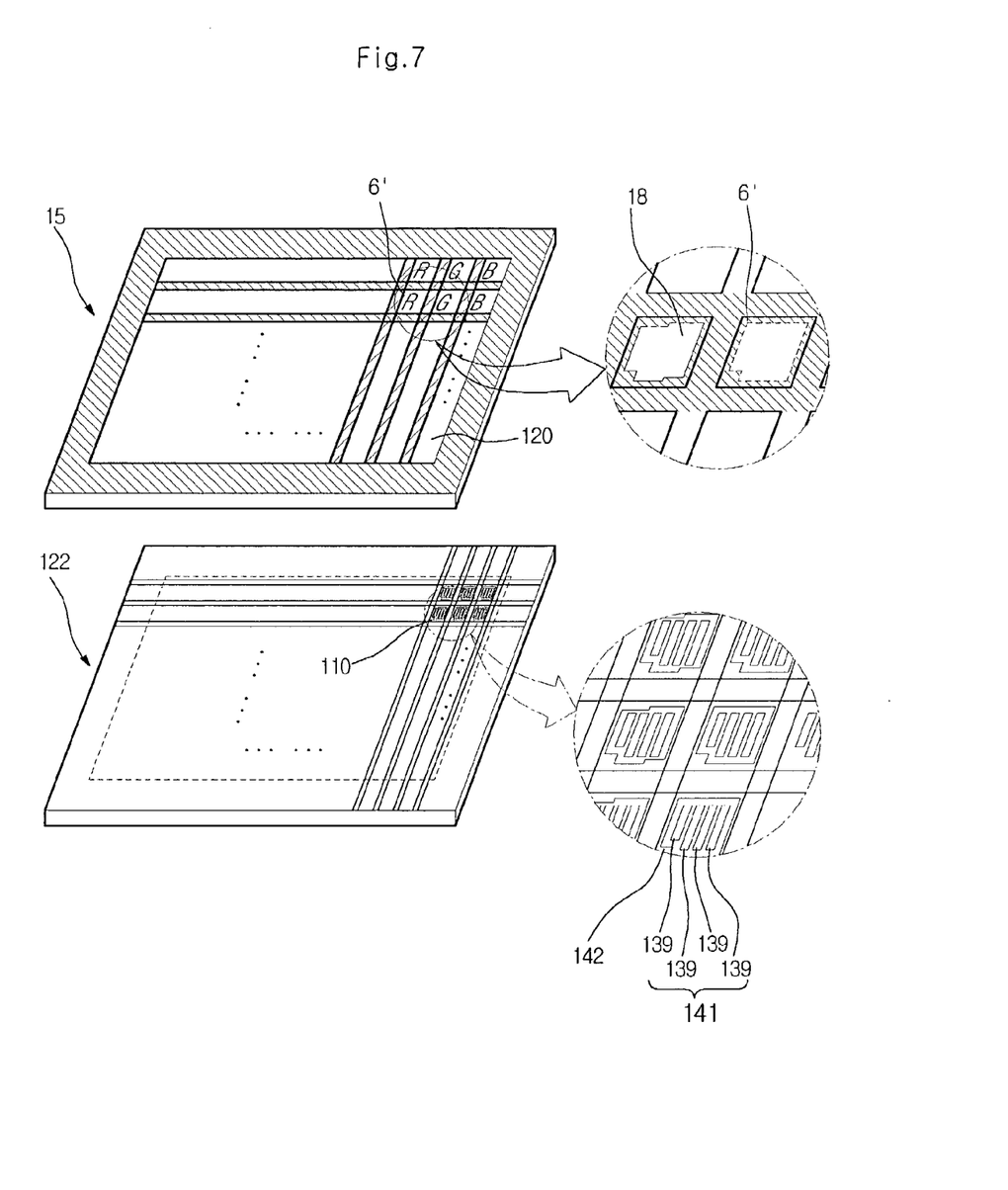
FIG. 7 is an exploded perspective view illustrating a part of the in-plane switching mode LCD device according to a present invention.

FIG. 7 is an exploded perspective view illustrating a part of the in-plane switching mode LCD device according to the present invention.

Referring to FIG. 7, the in-plane switching mode LCD panel of the present invention includes an upper substrate 15 having a black matrix (BM) 6' and sub-color filters (R, G, B) 18, and a lower substrate 122 having the sub-pixels 110 arranged in a matrix shape, and a liquid crystal material (not shown) fills between the upper substrate 15 and the lower substrate 22.

The black matrix 6' is provided in the region between the sub color filters 18 and functions as a light shutter. Also, the region including the black matrix 6' is formed to correspond to a non-aperture region 142 on the lower substrate 22. That is, the black matrix 6' overlaps the part of each sub-pixel 110 that does not include the plurality of blocks 139.

Therefore, the area of the displayed image region is not determined by the black matrix 6' formed on the upper substrate, but by an aperture region 141 defined by the plurality of blocks 139 formed on the lower substrate 122.

By defining the formation region of the black matrix 6' as above, even in the case that the region of the black matrix 6' is misaligned, stitch spot failure on the displayed image of the LCD device can be prevented. That is, forming the edges of the black matrix 6' outside of the aperture region defined by the blocks 139 solves the problem in which the stitch failure caused by overlap of the black matrix exposure masks occurs over an aperture region.

In more detail, as described above, with the enlargement of the lower substrate 22 and the upper substrate 15 in recent years, the black matrix cannot be formed using just one exposure mask. During the exposure step, the screen of the upper substrate is divided into a plurality of exposure regions. The each exposure region is exposed at one time to form the black matrix, which is known as a step exposure method. Therefore, as the display size of the upper substrate 5 is greater than that of the exposure mask used in the photo-process, stitch failure can occur at the point where the exposure regions overlap because of misalignment of the exposure mask over adjacent exposure regions.

Stitch failure can cause inconsistent sizes of the image display regions in different pixels such that the image display region is not the same in all of the pixels. However, according to the present invention, since the region of the black matrix 6' (and therefore, stitch overlaps) corresponds only to the non-aperture region 142 on the lower substrate 122. Thus, even if such a stitch failure occurs, the region of displayed images is not affected.

Therefore, according to the present invention, the black matrix 6' is structured such that the stitch failure does not affect the image display region in the LCD device.

Figure 8A:
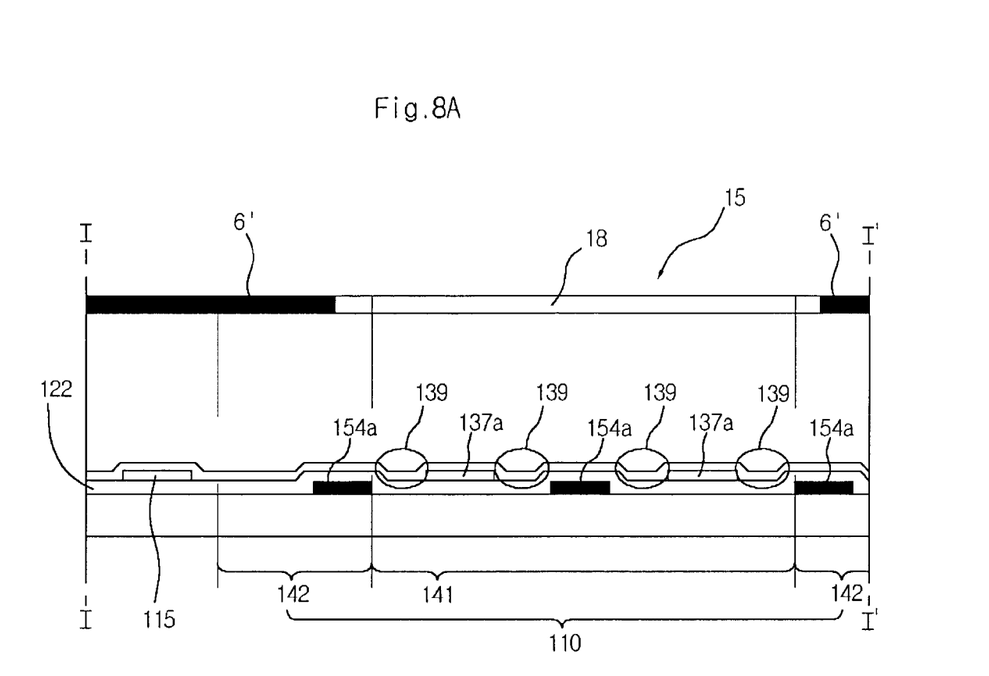
FIGS. 8A and 8B are sectional views of specific portions of the in-plane switching mode LCD device taken along the lines I-I', II-II' of FIG. 6.
Figure 8B:
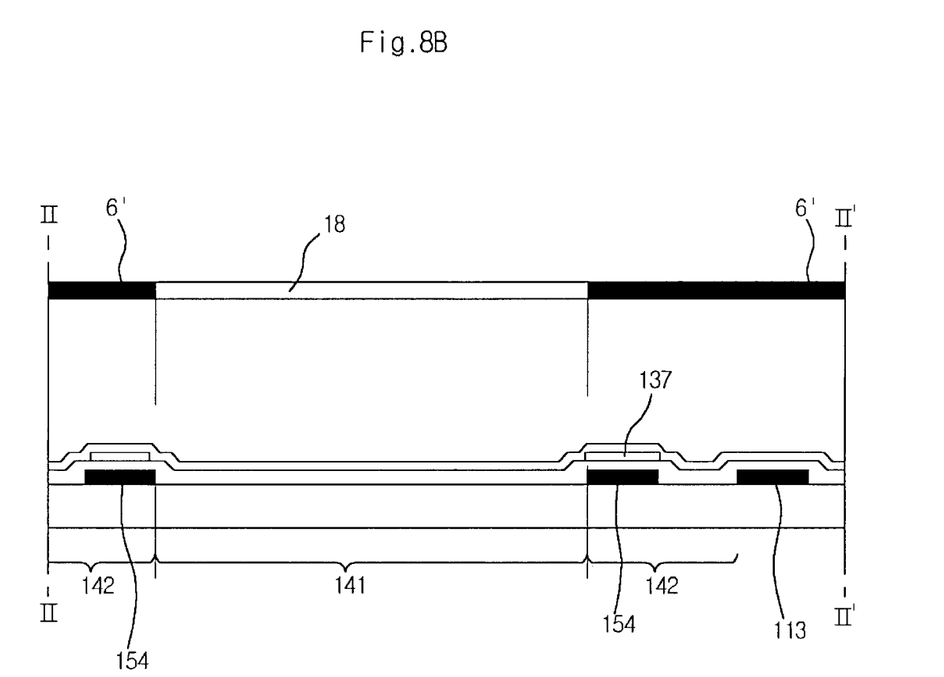

FIGS. 8A and 8B are sectional views of specific portions of FIG. 6, taken along the lines I-I', II-II' of FIG. 6.

That is, FIG. 8 illustrates a sub-pixel 110 on a lower substrate 122 and an upper substrate 15 formed over the sub-pixel 110 according to the present invention.

The lower substrate 15 includes a plurality of gate lines 113 and common lines 154 substantially in parallel, and a plurality of data lines 115 substantially perpendicular to the gate lines and the common lines. The sub-pixel 110 is defined by the region surrounded by the gate lines 113 and the data lines 115.

The sub-pixel 110 includes a thin film transistor having a gate electrode, a source/drain electrode (not shown), and a plurality of common electrodes 154a that extend from the common line, a plurality of pixel electrodes 137a diverged from the lead interconnection line, and a lead interconnection line connecting the pixel electrodes 137a connected with the drain electrode.

FIG. 8A illustrates a section (I-I') of the central portion of the sub-pixel 110, and the plurality of common electrodes 154a and the plurality of pixel electrodes 137a are formed in an alternating manner substantially parallel to one another. A plane electric field is formed between the pixel electrodes 137a and the common electrodes 154a, and a plurality of blocks 139 are formed for displaying images.

The pixel electrodes 137a and the common electrodes 154a can be formed on the same layer as the gate electrode or the source/drain electrode, or can be formed on a different layer with a gate insulating layer or with a protection layer between them, or can be employed on any structure regardless of the above structure.

Normally, one sub-pixel 110 has four blocks 139 therein as a four-block type.

Such sub-pixels 110 are aligned in a matrix shape on the lower substrate 15, and light from a backlight unit (not shown) passes through the plurality of blocks 139 of each sub-pixel 110 to display images. The region of the plurality of blocks 139 through which the light passes is an aperture region 141, and the region of the sub-pixel except the region of the blocks is a non-aperture region 142, which does not display images.

Further, the upper substrate includes the black matrix 6' and the sub-color filter 18.

The sub-color filter 18 passes all the light which passes through the aperture region 141 corresponding to the plurality of blocks on the lower substrate. The black matrix 6' is formed not to go beyond the region of the non-aperture region 142 on the lower substrate 122.

Further, FIG. 8B illustrates a section (II-II') of the central portion of the sub-pixel 110. In this case, the sub-color filter 18 passes all the light which passes through the aperture region 141 corresponding to the plurality of blocks 139 on the lower substrate 15. The black matrix 6' is formed not to go beyond the region of the non-aperture region 42 on the lower substrate 122. That is, edges of the black matrix 6' are formed in the non-aperture region. Thus, the black matrix 6' and the aperture region 141 are formed not to overlap with each other.

As described above, since the region of the black matrix 6' is confined into the non-aperture region 142 on the lower substrate 15, even if the stitch failure may occur in the shot boundaries when forming the black matrix 6' by the step exposure method, the actual image displayed is not affected.

According to the in-plane switching mode LCD device of the present invention as described above, the decrease of the picture quality related with the spots in each pixel of the LCD device due to the stitch failure during the formation of the black matrix can be prevented.

Further, since the stitch spot failure can be prevented without additional new process when manufacturing large-sized LCD devices, the production cost and yield can be improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An in-plane switching mode liquid crystal display device, comprising:
a lower substrate and an upper substrate;
a plurality of sub-pixels on the lower substrate and defined and surrounded by a plurality of gate lines and data lines, each of the plurality of sub-pixels having an aperture region and a non-aperture region surrounding the aperture region and including first and second common lines, a plurality of common electrodes between the first and second common lines, first and second pixel electrode lines and a plurality of pixel electrodes between the first and second pixel electrode lines, the first common line overlapping the first pixel electrode line and the second common line overlapping the second pixel electrode line, the aperture region including a plurality of blocks through which light is transmitted, each of the plurality of blocks defined by the first pixel electrode line, the second common line, the plurality of common electrodes and the plurality of pixel electrodes;
a black matrix having an opening and formed on the upper substrate; and
a liquid crystal layer between the lower substrate and the upper substrate,
wherein the plurality of common electrodes of each sub-pixel includes at least a first outermost common electrode and a second outermost common electrode, the first and second outermost common electrodes of each sub-pixel are disposed in the non-aperture region,
wherein an area of the opening of the black matrix is greater than at least a size of the aperture region including the plurality of blocks,
wherein the black matrix does not overlap the aperture region of the sub-pixel,
wherein a distance from an innermost edge of the black matrix to an outermost edge of the aperture region is sufficiently large in substantially all directions within each sub-pixel to avoid a stitch failure due to a misalignment caused by a step exposure method of forming the black matrix on the upper substrate, and
wherein the plurality of sub-pixels includes a first sub-pixel and a second sub-pixel adjacent to each other in a horizontal direction, and a width of the black matrix between an aperture region of the first sub-pixel and an aperture region of the second sub-pixel is smaller than or identical to a distance from the second outermost common electrode of the first sub-pixel to the first outermost common electrode of the second sub-pixel.

2. The in-plane switching mode liquid crystal display device of claim 1, wherein the plurality of gate lines and the common line are substantially in parallel with each other in a first direction, and the plurality of data lines are formed in a second direction substantially perpendicular to the gate lines and crossing the gate lines.

3. The in-plane switching mode liquid crystal display device of claim 1, wherein the plurality of common electrodes and the plurality of pixel electrodes in a respective sub-pixel are arranged in an alternating manner.

4. The in-plane switching mode liquid crystal display device of claim 1, wherein the aperture region includes the portion between each common electrode and pixel electrode adjacent to each other, and the non-aperture region includes the rest of the portion in the sub-pixel except the aperture region.

5. The in-plane switching mode liquid crystal display device of claim 1, wherein the area of the opening of the black matrix does not go beyond an outer end of the first outermost common electrode near the data line and an outer end of the second outermost common electrode near another data line.

6. The in-plane switching mode liquid crystal display device of claim 1, wherein the black matrix extends from the second outermost common electrode of the first sub-pixel to the first outermost common electrode of the second sub-pixel via the data line.

7. The in-plane switching mode liquid crystal display device of claim 1, wherein the plurality of sub-pixels includes a first sub-pixel and a second sub-pixel adjacent to each other in a vertical direction, and
a width of the black matrix between an aperture region of the first sub-pixel and an aperture region of the second sub-pixel is smaller than or identical to a distance from the first pixel electrode line of the first sub-pixel to the second common line of the second sub-pixel.

8. The in-plane switching mode liquid crystal display device of claim 7, wherein the black matrix extends from the first pixel electrode line of the first sub-pixel to the second common line of the second sub-pixel via the gate line.

* * * * *